Oct. 26, 1943. H. A. DE VRY ET AL 2,332,509
STAR WHEEL
Filed June 10, 1940 2 Sheets-Sheet 1

Inventors:
Herman A. DeVry
and Otto R. Nemeth
by
Attorneys.

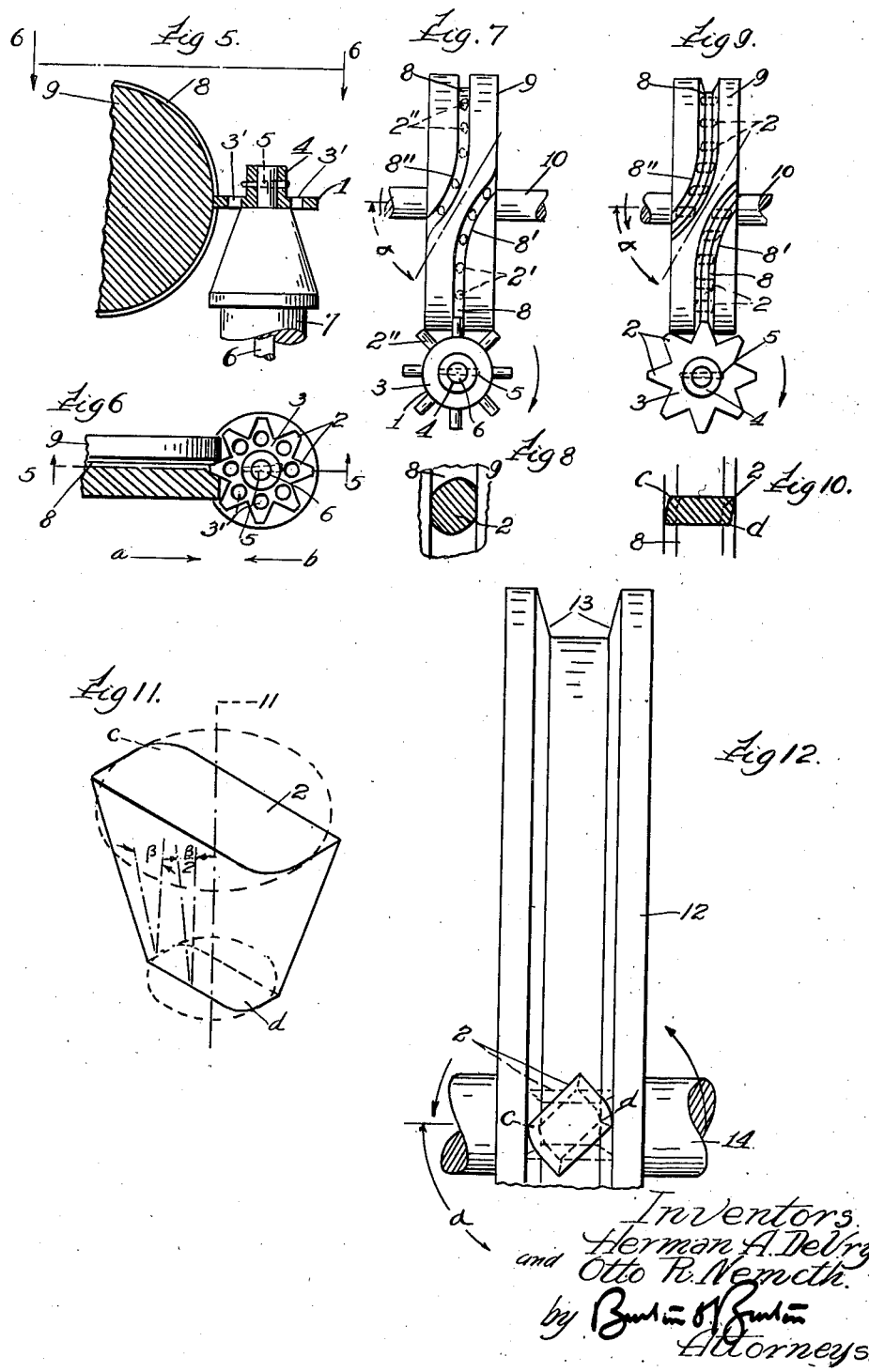

Patented Oct. 26, 1943

2,332,509

UNITED STATES PATENT OFFICE 2,332,509

STAR WHEEL

Herman A. de Vry and Otto R. Nemeth, Chicago, Ill., assignors to De Vry Corporation, Chicago, Ill., a corporation of Illinois Application June 10, 1940, Serial No. 339,770

5 Claims. (Cl. 74—436)

The present invention relates to star wheels as used for the step-by-step feeding action of bands or the like, and particularly film strips in cinematographic apparatus.

One object of the invention is to provide a star wheel in which the harmful results of wear between the pins or teeth of the wheel and the groove or cam of the driving wheel have been eliminated.

Another object is to provide a star wheel having pins or teeth and a driving wheel having a groove designed so that adjustment of one wheel with relation to the other will serve to take up the wear due to operation.

A further object of the invention is to provide an improved form of tooth or pin for a star wheel adapted to resist wear more effectively than those now in use. The invention also embraces means and a method for producing star wheels with teeth of this improved form with accuracy, speed and economy.

Further objects and advantages of the invention will appear to those skilled in the art from the following specification and the accompanying drawings, representing, by way of example, three embodiments thereof.

In the drawings:

Figure 5 is a side elevation similar to Figure 1 but taken partly in section, as indicated at line 5—5 on Figure 6, and showing a modified form of the invention.

Figure 6 is a top plan view partly in section, taken mainly as indicated at line 6—6 on Figure 5.

Figure 7 is a plan view showing a grooved driving wheel and a star wheel having straight cylindrical pins or teeth to cooperate therewith.

Figure 8 is a detail cross-section through one of the pins of the star wheel shown in Figure 7, being taken on a larger scale.

Figure 9 is a partly diagrammatic plan view indicating the mode of operation of the structure shown in Figures 5 and 6.

Figure 10 is a cross-section of one of the teeth of the star wheel of Figure 9 taken on an enlarged scale.

Figure 11 is an isometric view on a large scale for developing the correct form of tooth for the star wheel of Figures 5 and 6.

Figure 12 is a fragmentary and partially diagrammatic view showing a portion of a grinding wheel and illustrating a method of producing a star-wheel tooth in accordance with this invention.

Figure 1:
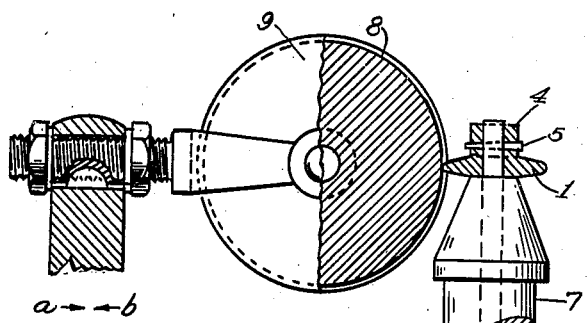
Figure 1 is a side elevation showing a multiple-pin star wheel cooperating with a one-groove cam, the view being taken partly in section.
Figure 2:
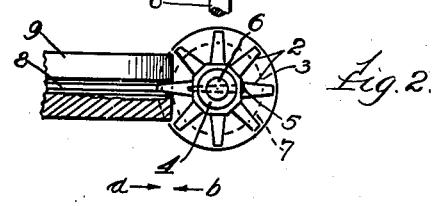
Figure 2 is a top plan view of the star and cam shown in Figure 1, but with a portion of the cam wheel broken away, and with a portion shown in section.

As shown in Figures 1 and 2, 1 is a multiple-pin star wheel, the pins or teeth 2 and the body 3 thereof being made integral, and the pins being of conical form. The hub 4 of the star wheel may be connected by means of a cross-pin 5 with a shaft 6 and with a sprocket, of which a fragment is shown at 7, if the star wheel is employed for driving the film of a cinematographic apparatus. The pins or teeth 2 mesh with a correspondingly tapered cam groove 8 of a driving wheel 9, and it may be understood that the star wheel 1 or the cam wheel 9, or both of them, may be mounted for adjustment toward and from each other, as indicated by the arrows $a$ and $b$ on Figure 2, for taking up wear due to the friction between the cam groove 8 and the tapered pins or teeth 2 of the star wheel.

Figure 3:
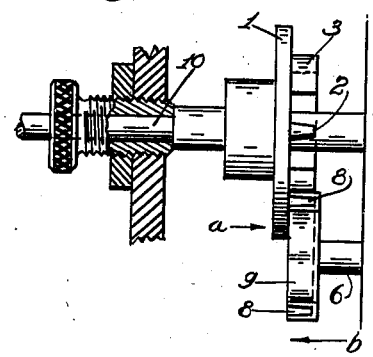
Figure 3 is a side elevation showing another embodiment of the invention which includes a one-pin star wheel and a cross-grooved cam to be driven thereby, constituting a Geneva stop movement.
Figure 4:
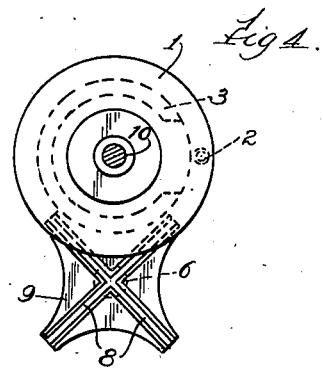
Figure 4 is an elevation of the same taken at right angles to Figure 3.

This same principle of adjustment for wear may be applied to a one-pin star wheel of the type shown at 1 in Figures 3 and 4, which has a conical pin 2 projecting from the face of the wheel, and a suitable arcuate rim or flange 3, which cooperate to provide a step-by-step action of the driven shaft 6, the pin 2 engaging in a cross-section 8 in the cam wheel 9 when the driving shaft 10 is rotated. In this structure the pin 2 is tapered, and the cross-grooves 8 are correspondingly tapered to fit the pin; and the resulting wear on the pin or on the grooves may be taken up by adjustment of the shafts 6 and 10, or one of them, so as to shift the pin and grooves toward each other in the directions indicated by arrows $a$ and $b$ on Figure 3.

Although conical pins will initially experience only linear contacts with their grooves, the tapered form of such pins permits of the adjustability indicated, and the wear which requires the adjustment incidentally tends to flatten the sides of the pins and increases their areas of contact. But, for the purpose of obtaining at the outset something more than linear contacts, we have developed another form of multiple-tooth star wheel, employing the basic idea of a tapered groove cooperating with a tapered pin. This improved structure is shown in Figures 5 and 6. In this form it is contemplated that the entire star wheel should be punched from relatively thin metal in one piece, and since it is important to reduce the weight and momentum of the star wheel as much as possible, the punched blank may include holes 3' formed in the base of each tooth 2, where the tapered form of the teeth allows of the removal of this metal without weakening of the wheel structure.

For determining the final or ideal shape for the teeth 2 of the star wheel we may first observe the operation of a simple type, such as that shown in Figures 7 and 8, in which the groove 8 of the cam wheel 9 is of rectangular shape, and in which the pins or teeth of the follower wheel are indicated as cylindrical in cross-section. Upon rotation of the shaft 10 and wheel 9 the "drunken screw" or cam groove 8 will cause intermittent rotation of the star wheel 1 in the direction of the arrow shown adjacent thereto on Figure 7. The pin 2' will stand motionless during its engagement with the straight portion of the groove 8, and will be caused to shift to the right as it is encountered by the inclined portion or thread 8'. Figure 7 indicates schematically several successive positions of the pin 2' from which it will be evident that said pin 2' will undergo slight bilateral wear by its contact with the straight portion of the groove 8, but that the inclined or thread portion 8' will impose relatively heavy wear at the left and upper portion of the pin, as viewed in its several positions in Figure 7, and also at the right and lower portion due to the oblique position of the walls of the thread 8' which are inclined to the axis of rotation at the angle α.

While the pin 2' of the star wheel is being shifted in the thread portion 8' of the cam groove the next pin 2" is fed into the adjacent inclined thread portion 8" of the groove and also experiences severe wear on its upper left and lower right-hand portions, as viewed at the several positions indicated in Figure 7 for the pin 2". The deformation of the originally cylindrical cross-section which eventually results, for example, in the case of pin 2', is indicated by the cross-sectional view of Figure 8, and it will be recognized that in a motion picture machine such deformation will cause irregularities in the step-by-step movement of the film band and consequent shifting or vibration of the successive frames of the picture during projection, such as to seriously impair the quality of the performance. Even though the deformed pins may have flat surfaces at opposite sides, these faces, worn down from the originally cylindrical shape, will fit loosely between the walls of the groove 8 and allow undesirable play in the operation.

From the foregoing it will be evident that even a tapered pin or tooth 2 of the type shown in Figures 5 and 6 will require a slight, but important, refinement in shape for insuring its smooth passage through the threaded portions 8' and 8" of the cam groove, as shown in Figure 9. This figure, arranged in the same schematic manner as Figure 3, indicates the successive positions of the pins 2 in the inclined portions of the cam groove, and shows that if the side walls of the groove were resilient they would have to yield to permit the pins to pass. Since they are not resilient, certain portions of the pins must be cut off in order that they may fit these portions of the groove. Figure 10 indicates the resulting cross-sectional shape of one of the teeth or pins 2 with opposite diagonal corners rounded off, as shown at c and d. This still leaves straight or flat surfaces adjacent the curved parts c and d; but, as compared with the originally cylindrical pin of Figure 8, it will be noted that the flat lateral bearing surfaces shown in Figure 10 are the original faces of the pin, whereas the cylindrical pins have originally only linear contact with the side walls of the cam groove.

The ideal geometrical shape of the curved surfaces c and d, as developed on an isolated pin or tooth 2, is conical, as indicated in Figure 11, these surfaces being portions of the surface of a truncated cone drawn in dotted outline, with its axis denoted by the line 11. This being so, the proper cross-section of the tooth will be thicker at the root than at the outer end, so that opposite faces of the star wheel will not be strictly parallel at the teeth 2. Figure 11 indicates the angle of inclination of the narrow side walls of the tooth to the axis 11 as β; and the angle of inclination of the broader side walls is shown as about β/2 to insure that the conical surfaces c and d shall merge properly into the flat faces of the tooth. Such a pin or tooth provides ideal flat seating against the straight side walls of the cam groove 8, and efficient curved bearing surfaces for contact with the inclined or threaded portions 8' and 8" of the groove, although it may be understood that the approximation to ideal shape, indicated in Figure 10, will also give reasonably good results. But the higher cost of production of the star wheel with beveled faces, suggested by Figure 11, will be compensated by its more nearly ideal operating qualities.

In view of the foregoing, we have shown in Figure 12 a means and method of producing a star wheel with teeth formed either as shown in Figure 10 or as indicated in Figure 11. This includes a grinding or cutting wheel 12, having a groove 13 of a diameter and shape corresponding to those of the cam wheel 8, except that the groove is a straight one, without inclined or threaded portions. This grinding wheel is rotated on its shaft 14, and a star wheel 1, formed from a blank like that shown in Figure 6, may be finished by inserting its teeth, one after another, in the groove of this grinding wheel, and turning each tooth within the groove slowly, as indicated by the arrows through the angle α as the grinding proceeds to round off two opposite diagonal corners of the tooth.

Whereas a conical pin is initially limited to a line contact, and develops a broader contact face only at the expense of lateral play between the side walls of the cam groove, tapered pins made in accordance with Figure 10 or 11 have the advantage of broad bearing surfaces from the beginning and throughout successive adjustments for wear, such as are indicated by the arrows a, b in Figure 6. It will also be evident that when the star wheel is made from a sheet metal plate which can be initially formed by a single punching operation, with subsequent refining of the teeth by the relatively simple grinding operation, the cost of production can be made even less than that of star wheels with conical pins or teeth. For the particular use for which these star wheels have been designed the sheet material from which they are made may be about one-sixteenth of an inch in thickness, or slightly greater, if the tapered form of tooth shown in Figure 11 is to be employed.

The invention is not to be understood as restricted to the embodiments and details herein set forth, since these may be modified by those skilled in the art without departing from the spirit and scope of the invention; rather, the invention is intended to embrace all changes and variations of structure which might be included within the scope of the appended claims.

We claim as our invention:

1. In a mechanism for producing a step by step action, the combination with a multiple pin star wheel having substantially tapered pins, of a cam having one correspondingly tapered groove, said substantially tapered pins being of approximately rectangular section but with two diagonally opposite corners of this section cut off along curves.

2. In a mechanism for producing a step by step action, the combination with a multiple pin star wheel having substantially tapered pins, of a cam having a groove of correspondingly tapered cross-section and of a contour which includes thread portions inclined or deflected from a plane perpendicular to the axis of rotation, said substantially tapered pins being of approximately rectangular section but with two diagonally opposite corners of this section cut off along curves whereby the diagonal width of each pin fits snugly between the walls of the deflected or thread portions of the cam groove.

3. In a mechanism for producing a step by step action, the combination with a multiple pin star wheel having substantially tapered pins, of a cam having a correspondingly tapered groove which includes straight portions and thread portions inclined to the plane of the straight portions of the groove, said substantially tapered pins being of approximately rectangular section, two diagonally opposite corners of this section being cut off along curves with adjacent portions of the section at the tapering sides of each pin remaining to an extent sufficient to insure a snug fit between said pins and the straight as well as the thread portions of said groove.

4. In combination, a star wheel and a grooved cam for producing a step-by-step action, the star wheel having substantially tapered pins, and the cam having a correspondingly tapered groove, said substantially tapered pins being of approximately rectangular cross-section with diagonally opposite corners of this section rounded off.

5. In combination, a unitary star wheel element and a grooved cam element for producing a step-by-step action, the star wheel having substantially tapered pins, and the cam having a correspondingly tapered groove, said tapered pins being of approximately rectangular cross section with diagonally opposite corners of this section rounded off, and means for adjusting one of said elements bodily toward the other to eliminate the play caused by wear between said tapered pins and the tapered groove.

HERMAN A. DE VRY.
OTTO R. NEMETH.